United States Patent Office
3,531,551
Patented Sept. 29, 1970

3,531,551
DIELECTRIC CURING OF SPANDEX
Charles Franklin McDonough, Somerville, N.J., assignor to American Cyanamid Company, Stamford, Conn., a corporation of Maine
No Drawing. Filed June 9, 1967, Ser. No. 644,806
Int. Cl. B29c 25/00; B29f 3/00
U.S. Cl. 264—25  7 Claims

ABSTRACT OF THE DISCLOSURE

This invention relates to a process for curing spandex fibers with dielectric heat. In accordance with this invention, uncured wet-spun spandex thread is passed through a radio frequency field, the spandex material acts as a capacitor and the energy passing therethrough develops heat which cures the fiber. This curing process gives uniformity of curing so the resultant fibers have better physical properties than they would have if cured by conventional means.

---

This invention relates to a process for curing spandex fibers. More particularly, it relates to a process for dielectrically curing spandex fibers.

Spandex fibers or threads are made up of individual filaments, each filament being derived by passing a polyurethane spinning dope through a single orifice of a spinnerette.

Spandex fibers can be prepared by dry-spinning, melt-spinning, chemical-spinning or wet-spinning. In wet-spinning the dope composed of polymer, additives, and solvent is extruded into a liquid bath to form fibers which are washed and dried. Other processing steps may also be involved. The present invention is concerned with the wet-spinning process.

In the past, wet-spun spandex fibers have been air-cured at elevated temperatures below about 230° C. A preliminary drying step, as by exposure to infrared radiation, was occasionally employed. In one process, fibers are conveyed through a circulating hot-air drier on belts. Each belt has a variable speed adjuster, and the drier is divided into different temperature zones. Drier temperatures and belt speeds are varied with fiber denier so that the fiber is exposed for an optimum period to drying temperatures in the range of about 170° C. to 230° C. Certain pecularities associated with the moving belt used in curing of wet-spun spandex fibers by such methods make it difficult to obtain uniform curing of threads of high denier. When threads of low denier are being cured on a belt drier, static electricity is generated by rubbing of the belt and threads, causing the threads to contact each other. If such contact occurs before or during curing, they may fuse to each other with the result that they frequently break upon attempted separation. If it is attempted to raise the temperature of cure to thereby shorten the curing process, often the fibers stick to the belt and this leads to the obvious difficulty of removing the sticking fibers from the belt. There has not been, until the present time, a method for drying fibers which overcomes and avoids the foregoing difficulties.

It is thus an object of this invention to provide a method for curing spandex fibers which is free of the aforementioned difficulties. It is a further object of this invention to provide a method of curing spandex fibers, which method employs dielectric energy as the source of heat required for the curing process. Other objects will become apparent from the ensuing description of this invention.

A process has now been discovered for curing spandex fibers with dielectric heat. In accordance with this invention, uncured wet-spun spandex thread is passed through a radio frequency field, the spandex material acts as a capacitor and the energy passing therethrough develops heat which cures the fiber. This curing process gives uniformity of curing so the resultant fibers have better physical properties than they would have if cured by conventional means. Since higher curing temperatures are obtainable, curing can be more rapid than in the case of well-known heating equipment which depends upon large thermal gradients in the thread, such as a belt drier. Only a short length of unsupported thread is in the dielectric curing zone, and there is no physical contact and sticking of the threads to each other or to a belt. There is less space requirement for equipment. In a typical belt drier, the thread may travel over 200 feet in one minute, while in the dielectric curing apparatus, the thread can be out of the heating zone in less than a second. Thus, the floor space required is considerably less for the dielectric unit in comparison with a typical belt drier. Advantageously, only a short length of thread is unsupported during curing and there is thus much less danger of breakage and static-causer fusion of low denier fibers. Heating can be carefully controlled so that more energy is applied at the start to cause a quick heating and less energy applied later to maintain the curing temperature. An important feature of this invention is that the fibers can be handled so as to achieve simultaneous stretching and curing. In the wet-spinning process, the fibers can be extruded only at certain speeds. When the extrusion is too fast, breaks occur in the threads due to the weakness of the newly formed fibers. Of course, in the belt drier, little stretching is attempted during the cure because (1) this requires more intensive curing necessitating reducing the thread speed and (2) denier nonuniformities are introduced. With the dielectric curing process, stretching up to 300% is made possible because of the greater speed and uniformity of cure. Therefore, the dielectric process permits increased yield of fiber from each spinnerette.

In carrying out the spandex curing process of this invention, dried spandex thread is positioned in the space between two electrodes in which a radio frequency field has been established. A means is provided for continuously moving the thread through the radio frequency field at such a rate that the spandex remains in the field for a period of time sufficient to cause the desired degree of heat development and cure. The power input must be such that the fiber reaches a temperature which is less than that required to melt the fiber, but sufficient to effect the cure.

Power for the radio frequency field is produced by a conventional power unit. Practical radio frequencies are of the order of 5 to 15 megacycles. Spandex fiber has a dielectric loss of about 0.1–1.0 at 40–100,000 cycles per second. For comparison, nylon has a value of 0.03 and polypropylene, 0.01. Since it is known that about 50–200 B.t.u.'s/lb. are required for cure, it is easy to adjust speed of fiber movement and energy of field so that the proper curing conditions are obtained.

The electrodes are constructed of metals of high conductivity such as copper and aluminum. In order to minimize heat losses from the hot energized thread, the thread should be in a warm environment. The space around the thread can be conveniently heated by placing material of a high dielectric loss such as asbestos in the radio frequency field. A convenient approach is to place asbestos strips on the faces of the electrodes. The asbestos is also heated by the radio frequency field and it, in turn, heats the air surrounding the thread.

Before the spandex is subjected to the dielectric curing, it is desirable to remove the loose water adhering to the thread, as by suction or by blowing, and to dry the fiber, as by hot roll drying. Infrared drying can be used to augment the hot roll drying. About 3,000 B.t.u.'s per pound of spandex are required for the drying operation, as compared with 50–200 B.t.u.'s per pound for the curing operation.

The present invention is applicable to wet-spun spandex fibers which are prepared in any manner. The source of such fibers is not critical to the operation of this invention and is thus not a limitation thereupon. Illustrative of a few conventional processes by which wet-spun spandex fibers may be obtained, are those disclosed in U.S. Pats. 2,965,437, 3,036,878 and 3,097,192. Briefly, one of these processes involves making a spandex spinning dope consisting of polymer, additives, and solvent, extruding a filament into a coagulation bath, extracting the solvent from the fiber, and drying and curing the fiber; the fiber may be stretched at various points to enhance the physical properties.

Moreover, this invention can also apply to spandex fibers spun by means other than wet-spinning. In other types of spinning such as chemical and dry-spinning, it may be advantageous to apply dielectric curing to dry spandex fibers.

The following examples are presented to further illustrate this invention. Therein, the spandex fiber which is used is extruded into a 20% DMF-80% water bath, extracted of DMF by contacting with hot water, and dried on a belt drier at about 180° C. They were extruded from a dope containing about 17% solids and 83% DMF; the dope is derived by reacting one mole of polyester glycol and polyether glycol (9:1 ratio) with 2 moles of an aromatic diisocyanate; the resultant NCO-terminated urethane is extended with one or more diamines to form the spandex block copolymer of high molecular weight. The components specifically were:

polyester glycol=neo-pentyl adipate polyester (mol. wt.≈2000)
polyether glycol=poly(oxypropylene) glycol aromatic diisocyanate=p,p-diphenylmethane diisocyanate (MDI)

EXAMPLES 1 AND 2

Two lots of dried, but uncured, spandex thread of different deniers were cured by passing the threads between, and parallel with, two parallel 0.25" square by 2' long, aluminum electrodes. A radio frequency field was set up between the two electrodes by a 500-watt power unit at a frequency of 13.5 megacycles. Typical power readings for plate, screen and grid were 200–220, 65–72 and 10–13 milliamperes, respectively. Heat losses from the thread were reduced by loading 9" asbestos strips on both of the electrodes. The air gap between the electrodes was 0.25". The electrode assembly was enclosed in a box about 28" x 12" x 8", and the air in the box was heated by external means. The threads were passed through the unit at feed and windup speeds of 20 and 25–26 ft./minute, respectively. The threads had a residence time within the 9-inch effective electrode length of 1.7 seconds.

In Table I are shown the temperature of the surrounding air, the denier of the threads and the physical properties of the cured spandex threads.

TABLE I

| Ex. | Air temp. (° C.) | Denier | Modulus, 300 percent elongation (a./d.[1]) | Breaking tenacity (g./d.) | Ultimate elongation (percent) |
|---|---|---|---|---|---|
| 1 | 131 | 439 | 0.244 | 0.854 | 584 |
| 2 | 80 | 122 | 0.294 | 1.032 | 627 |

[1] g./d.=grams per denier.

The current minimum specifications for two commercial deniers of spandex fibers are shown below.

| Denier | Modulus (g./d.) | Breaking tenacity (g./d.) | Ultimate elongation (percent) |
|---|---|---|---|
| 420 | 0.240 | 0.66 | 550 |
| 140 | 0.240 | 0.66 | 500 |

These examples illustrate that satisfactorily cured spandex fiber is obtainable by the dielectric curing procedure of this invention.

EXAMPLES 3 AND 4

Using the apparatus described in Examples 1 and 2, 140 denier dried but uncured spandex thread was cured, using a residence time of 1.7 seconds and air temperature of 25 and 65° C., respectively. The results are shown in Table II.

TABLE II

| Example | Air temperature (° C.) | Ultimate elongation (percent) |
|---|---|---|
| 3 | 25 | 360 |
| 4 | 65 | 635 |

These results show the advantage of using warm air around the electrodes.

EXAMPLES 5–7

Using the apparatus described in Examples 1 and 2, 140 denier dried but uncured spandex thread was cured using an air temperature of 72–80° C. and a speed ratio of feed ot windup of ⅘. The residence time of the thread was varied by changing the feed and windup speeds of the thread.

The results are shown in Table III.

TABLE III

| Example | Residence time (sec.) | Ultimate elongation (percent) |
|---|---|---|
| 5 | 0.6 | 350 |
| 6 | 0.9 | 493 |
| 7 | 1.7 | 627 |

These examples demonstrate that sufficient residence time must be used to obtain an adequate cure.

EXAMPLES 8 AND 9

Using the apparatus described in Examples 1 and 2, dried but cured spandex threads of two different deniers were simultaneously cured and stretched. One fiber was stretched 100% stretch and the other 167%.

The physical properties of the cured threads are shown in Table IV.

TABLE IV

| Example | Feed denier | Feed speed (ft./sec.) | Windup speed (ft./sec.) | Windup denier | Modulus (g./d.) | Breaking tenacity (g./d.) | Ultimate elongation (percent) |
|---|---|---|---|---|---|---|---|
| 8 | 400 | 20 | 40 | 191 | 0.327 | 1.089 | 552 |
| 9 | 1,200 | 15 | 40 | 432 | 0.243 | 0.637 | 595 |

I claim:

1. A process of curing uncured spandex fibers which comprises passing said uncured fibers through a radio frequency field of 5–15 megacycles per second, said fibers being suspended and out of contact with solid material while passing through said radio frequency field, whereby the dielectric loss of the fiber results in the generation of heat and the fiber is cured.

2. The process of claim 1 wherein the uncured fibers have been prepared by wet-spinning.

3. The process of claim 1 wherein the area surrounding the field is enclosed to thereby reduce heat loss and maintain the fiber at a high curing temperature.

4. The process of claim 1 wherein the uncured fibers have been predried by either hot-roll drying or infrared drying followed by hot-roll drying.

5. The process of claim 1 wherein about 50–200 B.t.u.'s are generated for each pound of dried, uncured spandex fiber.

6. The process of claim 1 wherein the thread is simultaneously stretched and cured.

7. The process of claim 1 wherein the thread is stretched prior to curing.

References Cited

UNITED STATES PATENTS

| | | | |
|---|---|---|---|
| 3,154,612 | 10/1964 | Parczewski | 260—77.5 |
| 3,154,611 | 10/1964 | Dinbergs | 260—77.5 |
| 3,354,251 | 11/1967 | Thoma | 264—184 |
| 3,358,062 | 12/1967 | Lemelson | 264—96 |

OTHER REFERENCES

Rubber and Plastics Age: Vol. 44, No. 5, p. 525, May 1963.

ROBERT F. WHITE, Primary Examiner

R. H. SHEAR, Assistant Examiner